(12) United States Patent
Teo et al.

(10) Patent No.: US 8,000,416 B2
(45) Date of Patent: Aug. 16, 2011

(54) SYSTEM AND METHOD FOR GENERATING SOFT OUTPUT IN HYBRID MIMO SYSTEMS

(75) Inventors: Koon Hoo Teo, Lexington, MA (US); Ronghui Peng, Salt Lake City, UT (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 731 days.

(21) Appl. No.: 12/038,021

(22) Filed: Feb. 27, 2008

(65) Prior Publication Data
US 2009/0213966 A1    Aug. 27, 2009

(51) Int. Cl.
*H04L 27/06* (2006.01)

(52) U.S. Cl. ........ 375/341; 375/260; 375/262; 375/267; 375/299; 375/340; 375/347; 375/349

(58) Field of Classification Search .................. 375/260, 375/262, 267, 299, 340, 341, 347, 349; 455/101, 455/132, 296, 500, 562.1; 370/334
See application file for complete search history.

(56) References Cited

U.S. PATENT DOCUMENTS

| | | | |
|---|---|---|---|
| 7,590,195 B2 * | 9/2009 | Wang et al. | 375/340 |
| 2006/0209977 A1 | 9/2006 | Graef | |
| 2006/0209994 A1 | 9/2006 | Graef | |
| 2006/0245348 A1 | 11/2006 | Ojard | |
| 2007/0116143 A1 | 5/2007 | Bjerke | |
| 2007/0229329 A1 * | 10/2007 | Maru | 341/94 |
| 2008/0153449 A1 * | 6/2008 | Prasad et al. | 455/334 |

* cited by examiner

*Primary Examiner* — Leon Flores
(74) *Attorney, Agent, or Firm* — Dirk Brinkman; Gene Vinokur (57) ABSTRACT

A hybrid soft output MIMO detector uses a QR decomposition detector followed by a Markov chain Monte Carlo detector. The QRD-M generates initial candidate decision vectors, which are used as input for the Markov chain Monte Carlo detection to generate the soft output.

8 Claims, 5 Drawing Sheets

SYSTEM AND METHOD FOR GENERATING SOFT OUTPUT IN HYBRID MIMO SYSTEMS

FIELD OF THE INVENTION

This invention relates generally to a wireless communication system between transceivers having with multiple antennas, and more particularly to generating soft output for a received signal using spatial multiplexing.

BACKGROUND OF THE INVENTION

Multiple input, multiple output (MIMO) wireless communication systems use multiple transmit and receive antennas at transceivers to increase diversity using space and time coding. MIMO systems can also increase the data rate by using spatial multiplexing. There is a fundamental tradeoff between the increase in diversity and data rate for MIMO systems.

The most challenging part of detecting received signals in a MIMO system with spatial multiplexing is an exponential increase in the complexity of the receiver when a maximal a posteriori (MAP) detector is used. This makes it difficult to implement a MAP detector in practical systems.

Most of prior art detection methods for MIMO receivers can be classified into, but not limited to the following categories: linear; tree based; and Markov chain Monte Carlo (MCMC) detection.

Linear detection is the simplest. Similar to multi-user detection in a CDMA system, the interference from other antennas is successively suppressed by zero forcing (ZF) or minimal mean square error (MMSE) equalization. Thus, the MIMO detection is turned into a set of parallel single input, single output (SISO) detection problems. Therefore, linear detection is also called successive interference cancellation (SIC). However, ZF and MMSE are suboptimal.

Although linear detection has a very low complexity, there are several drawbacks. While suppressing the interference, part of the useful signal energy is cancelled because the channels of different antennas are usually not orthogonal, thus noise energy can increase. Linear detection also suffers from the error propagation from different antennas, and hence the spatial diversity order is reduced to one.

Vertical-Bell Labs Layered Space Time (V-BLAST) is an improved version of SIC. V-BLAST performs the SIC process in the order of the transmit antenna with a largest signal strength. The performance is improved because the error propagation is reduced with such an ordered scheme.

The tree based detection can theoretically achieve optimal performance by selecting a large sphere (in sphere decoding), or M parameter in a QR decomposition (QRD-M). The QRD-M decomposes a channel matrix H as H=QR based on a modified Gram-Schmidt (MGS) method, where Q is an $N_r \times N_t$ unitary matrix and R is an $N_t \times N_t$ upper triangular matrix, and $N_t$ and $N_r$ are the number of transmit and receive antennas, respectively. Tree based detection has a significant lower complexity than MAP detection. The tree based detector first applies the QRD-M over the channel matrix H to form a tree. The Euclidean distance is determined along paths of the tree from the root node to the leaf nodes. At each level of the tree, some paths are eliminated based on some criteria to lower the complexity.

For QRD-M, only M paths with a smallest accumulated Euclidean distance are selected. For the sphere decoding method, the paths with accumulated Euclidean distance smaller than a predefined sphere radius are selected. The complexity of tree detection corresponds to the parameter M for the QRD-M, and the sphere radius for sphere decoding.

While tree detection has a reduced complexity, when compared with the MAP detection, there are still some drawbacks for practical implementations. The sphere decoding has a variable complexity depending on a signal-to-noise (SNR). The complexity at lower SNR is significantly higher than at higher SNR, which means an uncontrollable delay. QRD-M has a constant complexity, which on the average is larger than sphere decoding. Another disadvantage of the QRD-M method is that it uses a time consuming sorting procedure, which introduces long delays. For example, if the system has four transmit and receive antennas, then for 64 quadrature amplitude modulation (QAM), M=64 should be used to obtain good performance. Therefore, at each layer of the tree, the QRD-M method needs to sort 64×64=4096 accumulated Euclidean distances to select 64 minimal distances, which leads to long delay. The conventional Quicksort procedure needs $m\log_2 M$ comparisons, where m is the number of items to be sorted. The sorting procedure is difficult to implement in parallel, which precludes hardware implementations.

The Markov chain Monte Carlo (MCMC) detection is near optimal. Similar to tree detection, MCMC detection also performs limited search over a subset of candidate samples to decrease the complexity. However, instead of tree based search, the MCMC detection uses a Markov chain based search. By using a set of parallel Markov chains, whose stationary distribution follows the channel probability density function (PDF), candidate samples with large probabilities are generated efficiently. The candidate samples are then used to determine the Euclidean distances. The MCMC detection can achieve better performance and decreased average complexity at a low SNR, as well for larger dimension problem. At a high SNR, the performance is worse than at the low SNR. This is because the Markov chains take a long time to reach stable states at a high SNR.

Therefore, it is desired to provide a MIMO detector with low complexity and for a wide range of SNR conditions.

SUMMARY OF THE INVENTION

A hybrid soft output MIMO detector uses a QR decomposition detector followed by a Markov chain Monte Carlo detector. The QRD-M generates initial candidate decision vectors, which are used as input for the Markov chain Monte Carlo detection to generate the soft output.

DETAILED DESCRIPTION OF THE PREFERRED EMBODIMENT

MIMIO System

The embodiments of the invention provide a method and system for MIMO detection with low complexity and latency for a wide range of SNR conditions. The invention provides a hybrid soft output MIMO detector that combines QR decomposition (QRD-M) detection followed by Markov chain Monte Carlo (MCMC) detection to generate soft output, which is near optimal for widely varying SNR conditions.

Figure 1A:
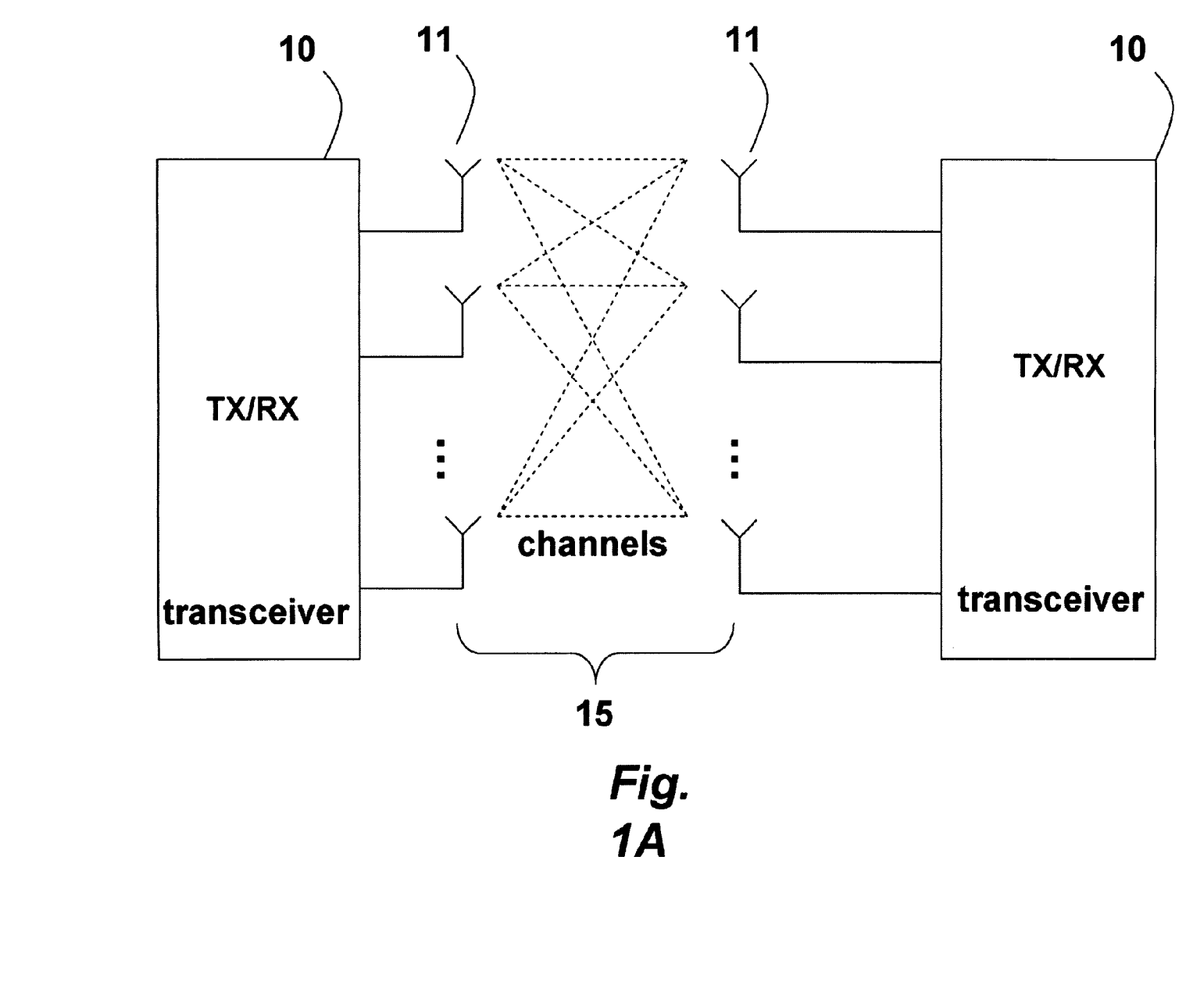
FIG. 1A is a block diagram of a spatial multiplexing MIMO system used by the embodiments of the invention.

FIG. 1A shows a spatial multiplexing MIMO system used by the embodiments of the invention. The system includes multiple transceivers 10. Each transceiver includes a set of antennas 11. Each transceiver can operate in either transmit (TX) or receive (RX) mode. In TX mode, the antennas are connected to transmit RF chains, and in RX mode the same antennas can be connected to receive RF chains. Signals 12 are transmitted via channels 15 subject to noise.

Figure 1B:
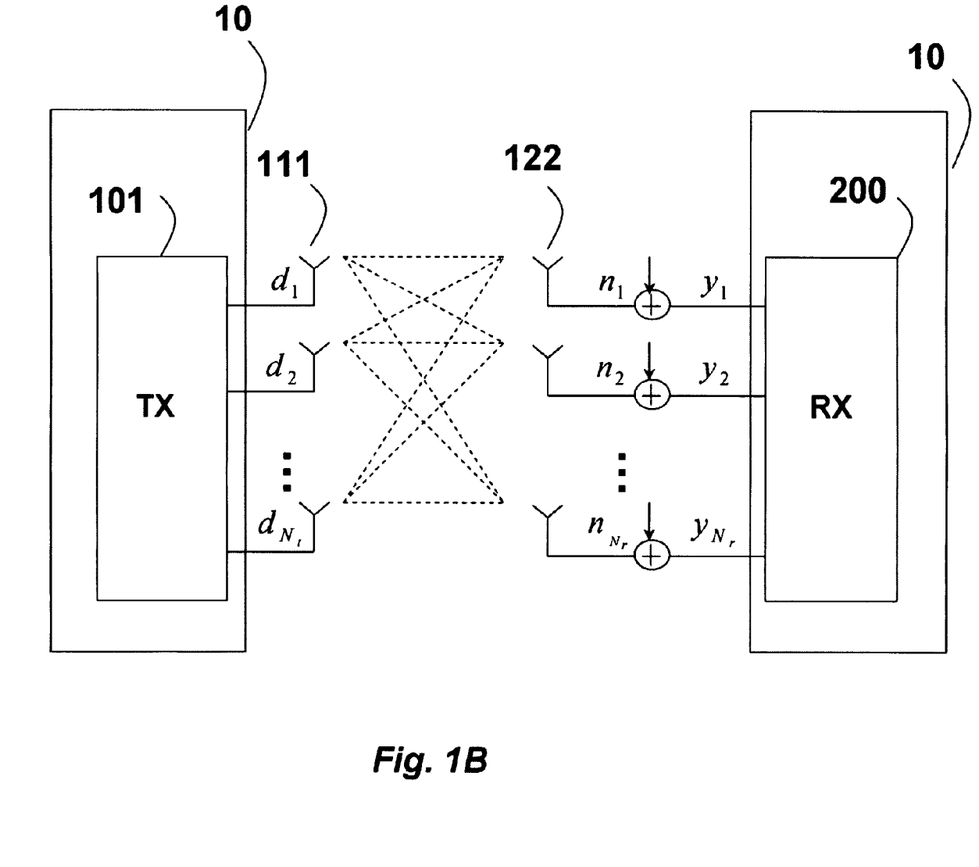
FIG. 1B is a block diagram of a first transceiver operating in transmit mode and a second transceiver operating in receive mode according to an embodiment of the invention.

FIG. 1B shows a first transceiver 10 operating in transmit mode by having a transmitter (TX) 101 connected to a set of transmit antennas 111. A second transceiver operates in receive mode by having a receiver (RX) 200 connected to a set of receive antennas 122.

In the transmitter 101, spatial multiplexing concurrently transmits independent data streams via the TX antennas 111, thereby increasing the data throughput. Interference can occur at the receivers because of the multiplexing of independent received data stream. A MIMO detection method and apparatus separates the data stream at the receiver.

In our hybrid MIMO system with $N_t$ TX antennas 111 and $N_r$ of RX antennas 122, the relation of the TX and the RX signals is $$y = Hd + n, \quad (1)$$

where $y \in \mathbb{C}^{N_t}$ is the received signal vector and $d \in \mathbb{C}^{N_t}$ is the transmitted signal vector, $H \in \mathbb{C}^{N_r \times N_t}$ is a channel matrix in which an element $h_{i,j}$ is an impulse response of the channels between an $i^{th}$ RX antenna and a $j^{th}$ TX antenna, and $n \in \mathbb{C}^{N_t}$ is a noise vector at the receiver. Herein, variables in lower case bold are vectors, and variables in upper case bold are matrices, as used in conventional notation.

MIMO Receiver

Figure 2:
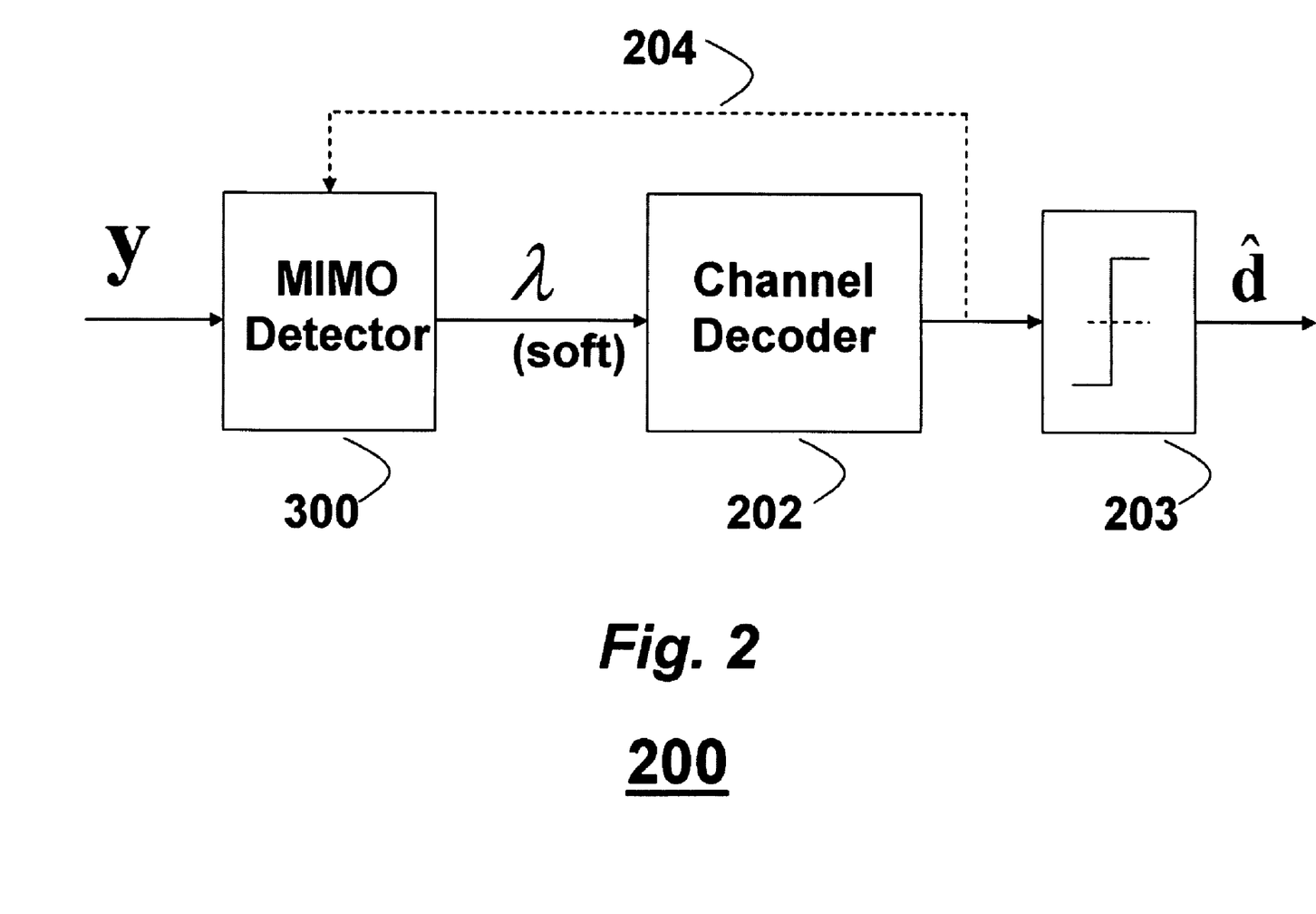
FIG. 2 is a block diagram of a MIMO receiver used by embodiments of the invention.

FIG. 2 shows a general structure of our hybrid MIMO receiver 200. The receiver includes a MIMO detector 300 according to embodiments of our invention, a channel decoder 202, and a hard decision unit 203. Convolutional, turbo, or low-density parity-check (LDPC) codes are generally used in MIMO wireless communication systems. Such codes need a soft output $\lambda$ as input to the decoder 202.

As defined conventionally, a soft output includes an approximate confidence measure (probability P) indicating a reliability of a decision bit in the decision vector d, hence we use the notation $\hat{d}$ indicate the estimate of the received decision vector, which corresponds to the transmitted signals.

Therefore, our soft output MIMO detector 300 generates the soft output for the channel decoder 202. In contrast to a conventional one-shot receiver, where detection and decoding is performed only one time, our receiver 200 performs iterative detection and decoding to obtain better performance. Therefore, the output from the channel decoder 202 is feed back 204 to the detector 300 to improve the detection.

For an optimal maximal a posterior (MAP) MIMO detector, the soft output is $$\lambda_k = \ln \frac{P(b_k = +1 \mid y)}{P(b_k = -1 \mid y)} \quad (2)$$

$$= \ln \frac{\sum_{b_{-k}} P(b_k = +1, b_{-k} \mid y)}{\sum_{b_{-k}} P(b_k = -1, b_{-k} \mid y)}$$

$$\approx \ln \frac{\max_{b_{-k}} P(b_k = +1, b_{-k} \mid y)}{\max_{b_{-k}} P(b_k = -1, b_{-k} \mid y)},$$

where the vectors $d = (b_1, b_2, \ldots b_{N_t M_c})$; $b_{-k} = (b_1, \ldots b_{k-1}, b_{k+1}, \ldots, b_{N_t M_c})$; $b_i \in \{-1, 1\}$, are the received vector and the received vector without bit $b_k$, respectively, k is the index of the bit under detection, $M_c$ is the number of bits for each constellation symbol, and $\lambda_k$ the soft output for bit $b_k$. The last term of Equation (2) is a maximum-logarithmic approximation version of MAP detection (max-log MAP). Hereinafter, we consider only the max-log MAP detection, without loss of generality.

To evaluate Equation (2), an exhaustive search over all the combinations of the decision vector d would have to be performed. This has a complexity of $2^{N_t M_c}$. We call the combinations of the decision vectors d a set of candidate decision vectors.

To reduce the complexity, we limit the search over a subset of the set of candidate decision vectors. An ideal subset includes only the "maximal terms" to be evaluated by the Equation (2). However, it is NP-hard to construct an ideal subset. Therefore, our near optimal hybrid method constructs a subset, which has a high probability to include the "maximal terms," or terms whose values are close to the "maximal terms." We call the subset with such properties as an "important subset." A size of the important subset is a measure of its complexity.

We use QRD-M and MCMC detection in a hybrid MIMO receiver to construct the important subset efficiently.

MCMC Detection

As described above, the MCMC detector uses a set of parallel Markov chains to generate samples. Because the stationary distribution of the Markov chains follow the conditional PDF P(y|d) of the channel, when Markov chains reach stable states, the samples are generated according to P(y|d). Therefore, the subset that includes those samples is the "important subset."

MCMC detection is as follows:

---

Generate an initial decision vector $d^{(0)}$ randomly
for n = 1 to I generate $d_0^{(n)}$ from distribution $p(d_0 = b \mid d_1^{(n-1)}, d_2^{(n-1)}, \ldots, d_{N_t M_c - 1}^{(n-1)}, y)$ generate $d_1^{(n)}$ from distribution $p(d_1 = b \mid d_0^{(n)}, d_2^{(n-1)}, \ldots, d_{N_t M_c - 1}^{(n-1)}, y)$

:

generate $d_{N_t M_c - 1}^{(n)}$ from distribution $p(d_{N_t M_c - 1} = b \mid d_0^{(n)}, d_1^{(n)}, \ldots, d_{N_t M_c - 2}^{(n)}, y)$ end for In the above procedure, $p(d_i = b \mid d_0^{(n)}, \ldots d_{i-1}^{(n)}, d_{i+1}^{(n-1)}, \ldots, d_{N_t M_c - 1}^{(n-1)}, y)$ $\propto p(y \mid d_0^{(n)}, \ldots d_{i-1}^{(n)}, d_i = b, d_{i+1}^{(n-1)}, \ldots, d_{N_t M_c - 1}^{(n-1)},) p(d_i = b),$ $M_c$ is the number of bits per constellation symbol, I is the number of iterations, $d^{(0)}$ is the initial candidate decision vector, $d_i^{(n)}$ is the $i^{th}$ bit generated at the $n^{th}$ iteration.

---

Figure 3:
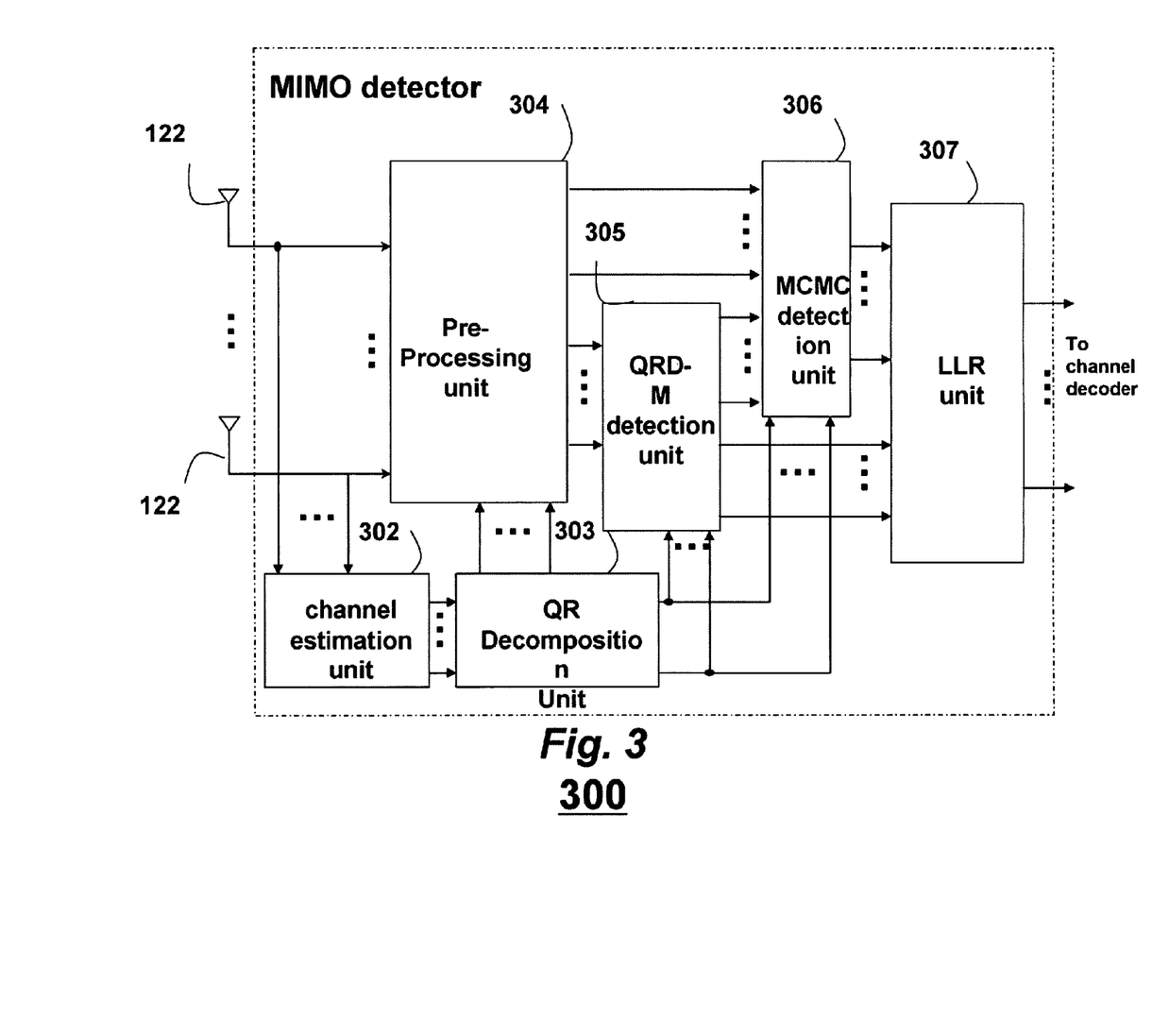
FIG. 3 is a block diagram of a MIMO detector according to embodiments of the invention.

To speed up the convergence of the MCMC detector 306, several MCMC detections can be preformed independently in parallel. The complexity of the MCMC detector depends on the number of parallel MCMC detectors, and the number of iterations performed by each MCMC detector.

The MCMC detector works well at a relatively low SNR. A small subset of decision vectors is constructed, which makes the complexity of MCMC detection relatively low. Also the complexity of MCMC detector does not increase exponentially with the increase in the number of antennas or constellation size. In addition, the parallel structure can be implemented in hardware.

However, as stated above, the MCMC detector is slow to convergence at a relatively high SNR. This increased latency introduces delays. This is because of the multi-model property of the PDF of the channel. The multi-model property of the channel PDF means that the channel PDF has many local maximal points. Thus, the MCMC can only transition from a current state to an adjacent state (adjacent meaning only one bit difference in the decision vector d) with transition distribution $$p(d_i = b \mid d_0^{(n)}, \ldots d_{i-1}^{(n)}, d_{i+1}^{(n-1)}, \ldots, d_{N_t M_c-1}^{(n-1)}, y).$$

At a relatively low SNR, the difference of the probability values between local maximal points and adjacent points is usually small. Therefore, the MCMC detector can easily transit from a local maximal state to an adjacent maximal state. However, at a relatively high SNR, the difference of probability values can be quite large. Therefore, the MCMC detector may get 'trapped' at a local maximal state, which is not globally optimal, and takes a long time to converge.

Prior art techniques have used a ZF or a MMSE detector to generate the initial candidate vectors for the MCMC detector. However, those techniques can only partially solved the problem, because both the ZF and MMSE detectors are suboptimal as stated above.

QRD-M Detection

According to the embodiments of the invention as shown in FIG. 3, a QRD-M detection 305 is preformed first, before the following MCMC detection 306. The decision vectors generated by the QRD-M are used by the MCMC detector as the initial set of candidate decision vectors.

As an advantage of our invention, a small M parameter for the QRD-M is sufficient to obtain a near optimal set of candidate decision vectors for the hybrid receiver. For example, M can be 12, instead of 64 as in the prior art QRD-M detector.

Furthermore, the complexity is reduced because the parameter M is small. Even at a low SNR, the small M parameter ensures the MCMC detector starts at near optimal states. Because the MCMC detector starts at a near optimal state, the number of parallel Markov chains and the number of iterations are reduced. In addition, the QRD-M method also reduces the time to determine the Euclidean distances.

Hybrid MIMO Detector

Figure 4:
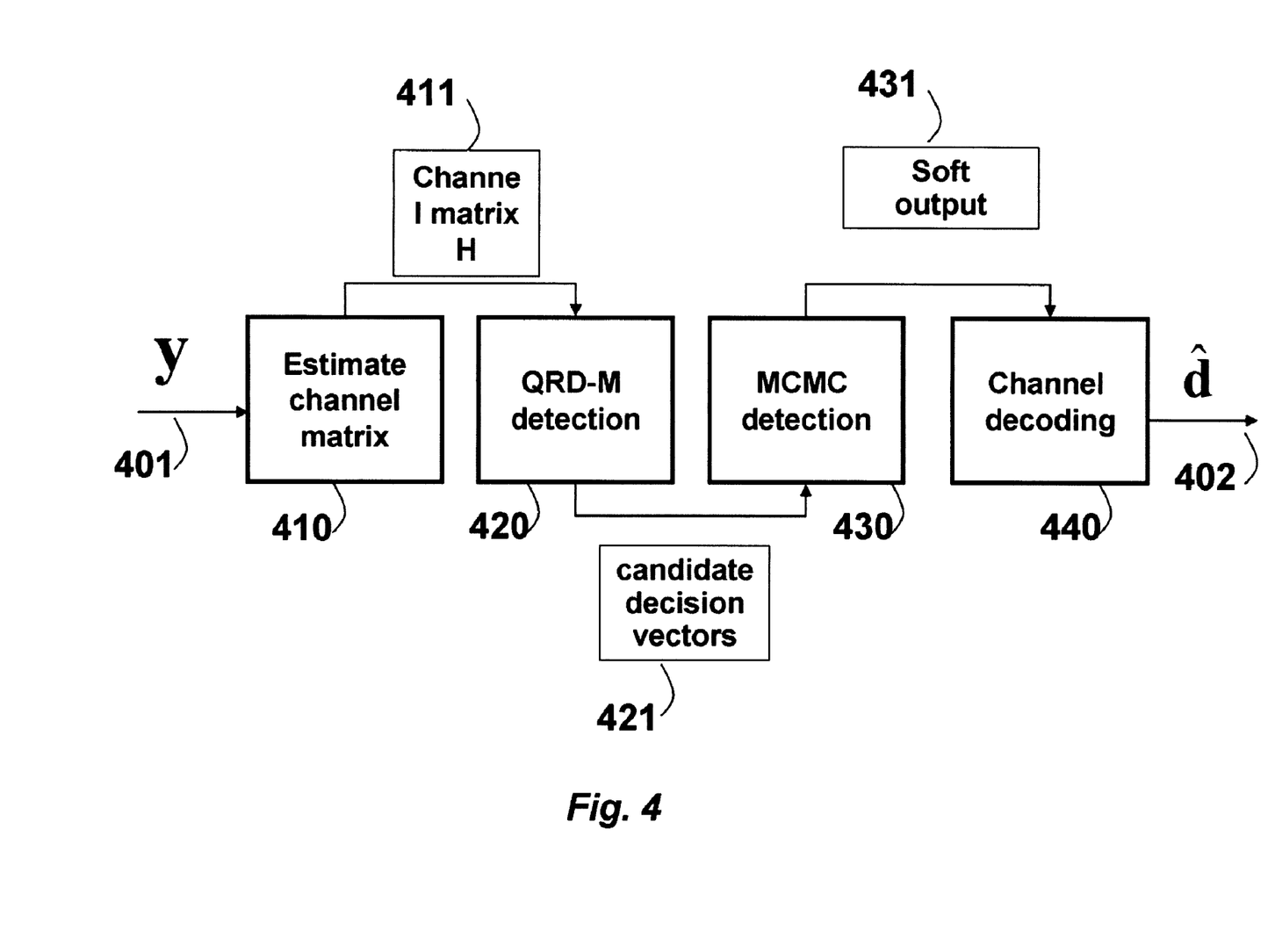
FIG. 4 is a block diagram of a method for generating soft output in a MIMO receiver according to the invention.

FIG. 3 shows the MIMO detector 300 according to embodiments of the invention. A method 400 of operation of the detector 300 is shown in FIG. 4.

The detector includes the $N_r$ receive antennas 122, a channel estimation unit 302, a QR decomposition unit 303, a preprocessing unit 304, a QRD-M detection unit 305, a MCMC detection unit 306, and a log-likelihood ratio (LLR) unit 307.

Received signals y 401 are received by the receive antennas 122. The received signal can be a training message or a data stream. The received signals are passed to the channel estimation unit 302 and the preprocessing unit 304. The channel estimation unit estimates 410 the channel matrix H 411, see FIG. 4.

The channel matrix H is sent to QR decomposition unit 303 to generate a unitary matrix Q and upper triangular channel matrix R. The preprocessing unit 304 determines $Q^H y$ and for both the QRD-M detection unit and the MCMC detection unit.

The QRD-M detection unit constructs an initial important subset. The initial important subset is sent to the MCMC detection unit as initial candidate decision vectors 421. A refined important subset is generated by the MCMC unit, and the soft output 431 is determined over the refined important subset.

In the QRD-M unit 303, the QR decomposition is performed over the estimated channel matrix as $$r = Q^H y = Q^H H d + Q^H n = Rd + Q^H n, \qquad (3)$$

where H=QR, $Q \in C^{N_r \times N_r}$ is the unitary matrix and $$R = \begin{bmatrix} T \\ 0_{N_r - N_t, N_t} \end{bmatrix},$$

where $T \in C^N$ is $t^{\times N_t}$ is the upper-triangular matrix.

In the preprocessing unit 304, the values of $Q^H y$ and Rd are determined for both the QRD-M detection unit 305 and the MCMC detection unit 306.

The complexity of the Euclidean distance computation in the MCMC detection unit 306 is reduced by the present invention as follows.

The conventional Euclidean distance computation in conventional MCMC detection is $$|\omega|^2 = \sum_{k=1}^{N_r} \left| y_k - \sum_{l=1}^{N_t} h_{k,l} d_l \right|^2. \qquad (3)$$

where $|\omega|^2$ is the Euclidean distance, and $y_k$ is the received symbol at $k^{th}$ receive antenna, $h_{k,l}$ is the impulse response of the channel between the $l^{th}$ transmit antenna and the $k^{th}$ receive antenna, and $d_l$ is candidate symbol transmitted from by the $l^{th}$ transmitter.

In the MCMC detection unit 306 according to embodiments of the invention, the Euclidean distance is determined by $$|\omega|^2 = \sum_{k=1}^{N_t} \left| r_k - \sum_{l=k}^{N_t} t_{k,l} d_l \right|^2. \qquad (5)$$

where $r_k, t_{k,l}, d_l$ are the entries of R,T,d, respectively.

With this approach, the complexity of our detection is decreased by at least half compared with the convention MCMC detection.

The complexity is reduced by using the Euclidean distance of a previous state, which is described as follows.

1) Determine the Euclidean distance of the initial state $\omega(0)$, $|\omega(0)|^2$. We store the distance metric and the square root of the distance metric.
2) At each state transition of the Markov chain, the Euclidean distance of the next state i+1 is determined using the previously stored Euclidean distances $\omega_i, \omega_i^2$. At each state transition, only one bit changes. If one bit of the symbol transmitted by antenna $l(1 \leq l \leq N_t)$ is changed, then the Euclidean distance is $$\omega_k(i+1) = \omega_k(i) + t_{k,l}d_l(i) - t_{k,l}d_l(i+1) \quad (6)$$
$$= \omega_k(i) - \phi;$$
$$0 \leq k \leq l$$
$$|\omega_k(i+1)|^2 = |\omega_k(i)|^2 - 2\operatorname{Re}(\omega_k(i)\phi^*) + |\phi|^2$$
$$|\omega(i+1)|^2 = \sum_{k=0}^{l} |\omega_k(i+1)|^2$$

where Re() is tie real part of a complexity number and $\phi$ represents $t_{k,l}d_l(i)-t_{k,l}d_l(i+1)$ for convenience.

Because $|\omega_k(i)|^2$ and $|\phi=t_{k,l}d_l(i)-t_{k,l}d_l(i+1)|^2$ are predetermined, only $$2\frac{N_t+1}{2} = N_t + 1$$

multiplications are required, reducing the complexity of our hybrid receiver.

As shown in FIG. 4, signals y 401 are received at multiple received antennas via corresponding channels to transmit antennas. A channel matrix H 411 is estimated. The channel matrix H is decomposed to matrices QR using a QR decomposition. The matrices are used to determine 420 candidate decision vectors 421 in a QRD-M decision unit. The candidate decision vectors are input to a MCMC decision unit to determine 430 the soft output 431. The soft output can than be input to a channel decoding unit 440 to generate the decision vector $\hat{d}$ 402, which is a best estimate of the corresponding transmitted signals d.

Effect of the Invention

The embodiments of the invention provide a method and system for MIMO detection with low complexity and latency for a wide range of SNR conditions. Although, the exact SNR range depends on the channel model, constellation size, number of antennas, channel codes, the invention can achieve about 1 dB gain over a conventional QRD-M detector.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for generating soft output for a received signal in a multiple input, multiple output (MIMO) receiver, comprising:
   estimating a channel matrix H from signals y received at a plurality of antennas via corresponding channels;
   decomposing, using M parameters, the channel matrix H to obtain a unitary matrix Q and upper triangular matrix R;
   determining, in an M parameter QR decomposition (QRD-M) detection unit, a set of candidate decision vectors based on the matrices Q and R and the received signals y;
   determining, in a Markov chain Monte Carlo (MCMC) detection unit, an important subset of the set of candidate decision vectors; and
   determining, in a log-likelihood ratio unit, a soft output using the important subset, wherein a relation between transmitted signals d and the received signals y is y=Hd+n, where $y \in C^{N_r}$ is a vector of the received signals, $d \in C^{N_t}$ is a vector of the transmitted signals, $H \in C^{N_r \times N_t}$ is the channel matrix in which an element $h_{i,j}$ is an impulse response of the channels between an $i^{th}$ receive antenna and a $j^{th}$ transmit antenna, and $n \in C^{N_r}$ is a noise vector, wherein the decomposition is performed over the channel matrix as $r=Q^Hy=Q^HHd+Q^Hn=Rd+Q^Hn,$ where H=QR, $Q \in C^{N_r \times N_r}$ is the unitary matrix and $$R = \begin{bmatrix} T \\ 0_{N_r-N_t,N_t} \end{bmatrix},$$

where $T \in C^{N_t \times N_t}$ is the upper-triangular matrix, and wherein the MCMC detection unit determines a Euclidean distances according to $$|\omega|^2 = \sum_{k=1}^{N_t} \left| r_k - \sum_{l=k}^{N_t} t_{k,l}d_l \right|^2,$$

where $|\omega|^2$ is the Euclidean distance, $r_k, t_{k,l}, d_l$ are the entries of vectors r,d and matrix T.

2. The method of claim 1, in which the signals y are independent of each other.

3. The method of claim 1, in which the soft output includes an approximate confidence measure indicating a reliability of a decision bit in a decision vector $\hat{d}$, which is an estimate of the transmitted signals d.

4. The method of claim 1, in which the received signals have a wide range of signal to noise ratio conditions.

5. The method of claim 1, in which a preprocessing unit determines $Q^Hy$ and Rd for both the QRD-M detection unit and the MCMC detection unit.

6. The method of claim 1, in which the Euclidean distance is modified according to $$\omega_k(i+1) = \omega_k(i) + t_{k,l}d_l(i) - t_{k,l}d_l(i+1) = \omega_k(i) - \phi; 0 \leq k \leq l$$

$$|\omega_k(i+1)|^2 = |\omega_k(i)|^2 - 2\operatorname{Re}(\omega_k(i)\phi^*) + |\phi|^2$$

$$|\omega(i+1)|^2 = \sum_{k=0}^{l} |\omega_k(i+1)|^2,$$

where Re( ) is a real part of a complexity number and $\phi$ represents $$t_{k,l}d_l(i) - t_{k,l}d_l(i+1).$$

7. The method of claim 1, further comprising:
   channel decoding the soft output to estimate the transmitted signals d.

8. A transceiver including a transmitter and a receiver each of which is configured to be connectable to a set of antennas, and in which the receiver comprises:

means for estimating a channel matrix H from signals y received at a plurality of antennas via corresponding channels;

means for decomposing, using M parameters, the channel matrix H to obtain a unitary matrix Q and upper triangular matrix R;

means for determining, in an M parameter QR decomposition (QRD-M) detection unit, a set of candidate decision vectors based on the matrices Q and R and the received signals y;

means for determining, in a Markov chain Monte Carlo (MCMC) detection unit, an important subset of the set of candidate decision vectors; and means for determining, in a log-likelihood ratio unit, a soft output using the important subset, wherein a relation between transmitted signals d and the received signals y is y=Hd+n, where y ∈ $C^{N_r}$ is a vector of the received signals, d ∈ $C^{N_t}$ is a vector of the transmitted signals, H ∈ $C^{N_r \times N_t}$ is the channel matrix in which an element $h_{i,j}$ is an impulse response of the channels between an $i^{th}$ receive antenna and a $j^{th}$ transmit antenna, and n ∈ $C^{N_r}$ is a noise vector, wherein the decomposition is performed over the channel matrix as $r = Q^H y = Q^H H d + Q^H n = Rd + Q^H n,$ where H=QR, Q ∈ $C^{N_r \times N_r}$ is the unitary matrix and $$R = \begin{bmatrix} T \\ 0_{N_r - N_t, N_t} \end{bmatrix},$$

where T ∈ $C^{N_t \times N_t}$ is the upper-triangular matrix, and wherein the MCMC detection unit determines a Euclidean distances according to $$|\omega|^2 = \sum_{k=1}^{N_r} \left| r_k - \sum_{l=k}^{N_r} t_{k,l} d_l \right|^2,$$

where $|\omega|^2$ is the Euclidean distance, $r_k$, $t_{k,l}$, $d_l$ are the entries of vectors r, d and matrix T.

* * * * *